US006826822B2

(12) United States Patent
Pan et al.

(10) Patent No.: US 6,826,822 B2
(45) Date of Patent: Dec. 7, 2004

(54) METHOD FOR PREPARING RUBBER PLATE USED IN AN ION IMPLANTER

(75) Inventors: Cheng-Min Pan, Hsinchu (TW); Hua-Jen Tseng, Hsinchu (TW); Chun-Chieh Lee, Hsinchu (TW); Sheng-Feng Hung, Hsinchu (TW)

(73) Assignee: Mosel Vitelic, Inc., Hsinchu (TW)

( * ) Notice: Subject to any disclaimer, the term of this patent is extended or adjusted under 35 U.S.C. 154(b) by 263 days.

(21) Appl. No.: 10/074,859

(22) Filed: Feb. 11, 2002

(65) Prior Publication Data

US 2002/0121166 A1 Sep. 5, 2002

(30) Foreign Application Priority Data

Mar. 5, 2001 (TW) ....................................... 90105018 A

(51) Int. Cl.[7] .................................................. H01S 4/00

(52) U.S. Cl. ....................... 29/592.1; 29/602.1; 29/833; 29/835; 83/565; 219/121.71

(58) Field of Search ............................ 29/592.1, 602.1, 29/833, 835; 83/565; 219/121.71

(56) References Cited

U.S. PATENT DOCUMENTS

| | | | | |
|---|---|---|---|---|
| 3,617,683 A | * | 11/1971 | Beresford et al. | 219/121.7 |
| 4,458,133 A | * | 7/1984 | Macken | 219/121.67 |
| 5,744,776 A | * | 4/1998 | Bauer | 219/121.7 |
| 6,139,049 A | * | 10/2000 | Gallagher | 280/728.3 |
| 6,216,354 B1 | * | 4/2001 | Carbone | 33/565 |

FOREIGN PATENT DOCUMENTS

| | | | | |
|---|---|---|---|---|
| CN | 129288 | | 2/1990 | |
| JP | 02037656 A | * | 2/1990 | H01J/37/317 |
| JP | 05211129 A | * | 8/1993 | H01L/21/265 |

OTHER PUBLICATIONS

"Formation of shallow P–type layers by implantation of molecular diborane ions"; Yokota, K.; Nishimura, H.; Terada, K.; Nakamura, K.; Sakai, S.; Tanjou, M.; Takano, H.; Kumagai, M.; 1998 International Conference on Jun. 22–26, 1998; pp. 9194.*

* cited by examiner

*Primary Examiner*—A. Dexter Tugbang
*Assistant Examiner*—Paul D. Kim
(74) *Attorney, Agent, or Firm*—Townsend and Townsend and Crew LLP

(57) ABSTRACT

One embodiment is directed to a method for trimming a rubber plate which is configured to be placed on a platform of an ion implanter, wherein the platform of the ion implanter includes a plurality of primary holes and a plurality of primary notches. The method comprises providing a template including a plurality of secondary holes corresponding to the plurality of primary holes of the platform of the ion implanter and a plurality of secondary notches corresponding to the plurality of primary notches of the platform of the ion implanter; and trimming the rubber plate using the template as a guide to form a plurality of tertiary holes in the rubber plate corresponding to the plurality of secondary holes of the template and to form a plurality of tertiary notches in the rubber plate corresponding to the plurality of secondary notches of the template.

12 Claims, 7 Drawing Sheets

METHOD FOR PREPARING RUBBER PLATE USED IN AN ION IMPLANTER

CROSS-REFERENCES TO RELATED APPLICATIONS

This application claims priority from R.O.C. patent application Ser. No. 090105018, filed Mar. 5, 2001, the entire disclosure of which is incorporated herein by reference.

BACKGROUND OF THE INVENTION

The present invention relates to a rubber plate used in an ion implanter, as well as the method and accessories for preparing the rubber plate.

The ion implanter is a complex apparatus used in the manufacture of doped wafers. During the ion implantation process, wafers to be processed are placed on a platform within the load/unload system of the ion implanter. The present invention is related to a rubber plate disposed on top of this platform.

The platform, represented as platform 10 in FIG. 1*a*, has primary notches 12 for the wafer pad to pass through and primary holes 11 for locating the platform 10. Wafers are not placed directly on top of the platform. Instead, a rubber plate 30 is placed between the wafer and the platform 10 to prevent sliding, direct impact between the wafers and the platform, and more importantly, allow the wafers to lay evenly on the platform so the heat generated during implanting can be dissipated evenly.

Preparation of the rubber plate in the prior art consists of, first, attaching the rubber plate 30 to the platform 10 (FIG. 1*b*) and then trimming off unwanted parts from the rubber plate 30 (FIG. 1*c*). However, this procedure tends to cause damage to the platform 10. Also, the rubber plate 30 may peel off the platform 10 and cause uneven cooling of the wafers during ion implantation, which in turn leads to sticky or broken wafers. Also, debris may be produced during the trimming process and hamper wafer production.

BRIEF SUMMARY OF THE INVENTION

The present invention is directed to a method and accessories for trimming a rubber plate used in an ion implanter without the above drawbacks of the prior art. In specific embodiments, the rubber plate is trimmed prior to being placed on the platform using a template that matches the shape and features of the platform. The trimmed rubber plate is then placed on top of the platform. In this way, the problems of in situ trimming of the rubber plate are avoided so as to ensure the quality and efficiency of wafer production.

An aspect of the present invention is directed to a set of trimming accessories for trimming a rubber plate which is configured to be placed on a platform of an ion implanter, wherein the platform of the ion implanter includes a plurality of primary holes and a plurality of primary notches. The set of trimming accessories comprises a trimming member configured to trim the rubber plate and a template. The template includes a plurality of secondary holes corresponding to the plurality of primary holes of the platform of the ion implanter and a plurality of secondary notches corresponding to the plurality of primary notches of the platform of the ion implanter. The template is adapted to guide the trimming member to trim the rubber plate to form a plurality of tertiary holes in the rubber plate corresponding to the plurality of secondary holes of the template and to form a plurality of tertiary notches in the rubber plate corresponding to the plurality of secondary notches of the template.

In some embodiments, the trimming member comprises a knife or a laser. An optical detector is configured to detect contours of the template formed by the plurality of secondary holes and the plurality of secondary notches. A controller is coupled to the trimming member and to the optical detector to control the trimming member based on the detected contours of the template from the optical detector to trim the rubber plate to form the plurality of tertiary holes in the rubber plate corresponding to the plurality of secondary holes of the template and to form the plurality of tertiary notches in the rubber plate corresponding to the plurality of secondary notches of the template. The template is adapted to be placed over the rubber plate for guiding the trimming member to trim the rubber plate.

In accordance with another aspect of the present invention, a method is provided for trimming a rubber plate which is configured to be placed on a platform of an ion implanter, wherein the platform of the ion implanter includes a plurality of primary holes and a plurality of primary notches. The method comprises providing a template including a plurality of secondary holes corresponding to the plurality of primary holes of the platform of the ion implanter and a plurality of secondary notches corresponding to the plurality of primary notches of the platform of the ion implanter. The rubber plate is trimmed using the template as a guide to form a plurality of tertiary holes in the rubber plate corresponding to the plurality of secondary holes of the template and to form a plurality of tertiary notches in the rubber plate corresponding to the plurality of secondary notches of the template.

In some embodiments, the template is placed over the rubber plate for guiding a trimming member to trim the rubber plate. A controller automatically controls a trimming member based on contours of the template to trim the rubber plate to form the plurality of tertiary holes in the rubber plate corresponding to the plurality of secondary holes of the template and to form the plurality of tertiary notches in the rubber plate corresponding to the plurality of secondary notches of the template. The method may further comprise optically detecting the contours of the template and providing the detected contours to the controller to automatically control the trimming member based on the detected contours of the template to trim the rubber plate. The tertiary holes in the rubber plate are trimmed to match the primary holes of the platform and the tertiary notches in the rubber plate are trimmed to match the primary notches of the platform.

Yet another aspect of the present invention relates to a method for trimming a rubber plate which is configured to be placed on a platform of an ion implanter, wherein the platform of the ion implanter includes a plurality of primary holes and a plurality of primary notches. The method comprises providing a template including a plurality of secondary holes corresponding to the plurality of primary holes of the platform of the ion implanter and a plurality of secondary notches corresponding to the plurality of primary notches of the platform of the ion implanter. The template is placed over the rubber plate. A trimming member is automatically controlled for trimming the rubber plate to form a plurality of tertiary holes in the rubber plate corresponding to the plurality of secondary holes of the template and to form a plurality of tertiary notches in the rubber plate corresponding to the plurality of secondary notches of the template.

In some embodiments, the contours of the template are optically detected and the detected contours are provided to the controller to automatically control the trimming member based on the detected contours of the template to trim the rubber plate. The tertiary holes in the rubber plate are trimmed to match the primary holes of the platform and the tertiary notches in the rubber plate are trimmed to match the primary notches of the platform. The trimmed rubber plate can then be placed on the platform so that the tertiary holes of the rubber plate match the primary holes of the platform and the tertiary notches of the rubber plate match the primary notches of the platform.

DETAILED DESCRIPTION OF THE INVENTION

Figure 1A:
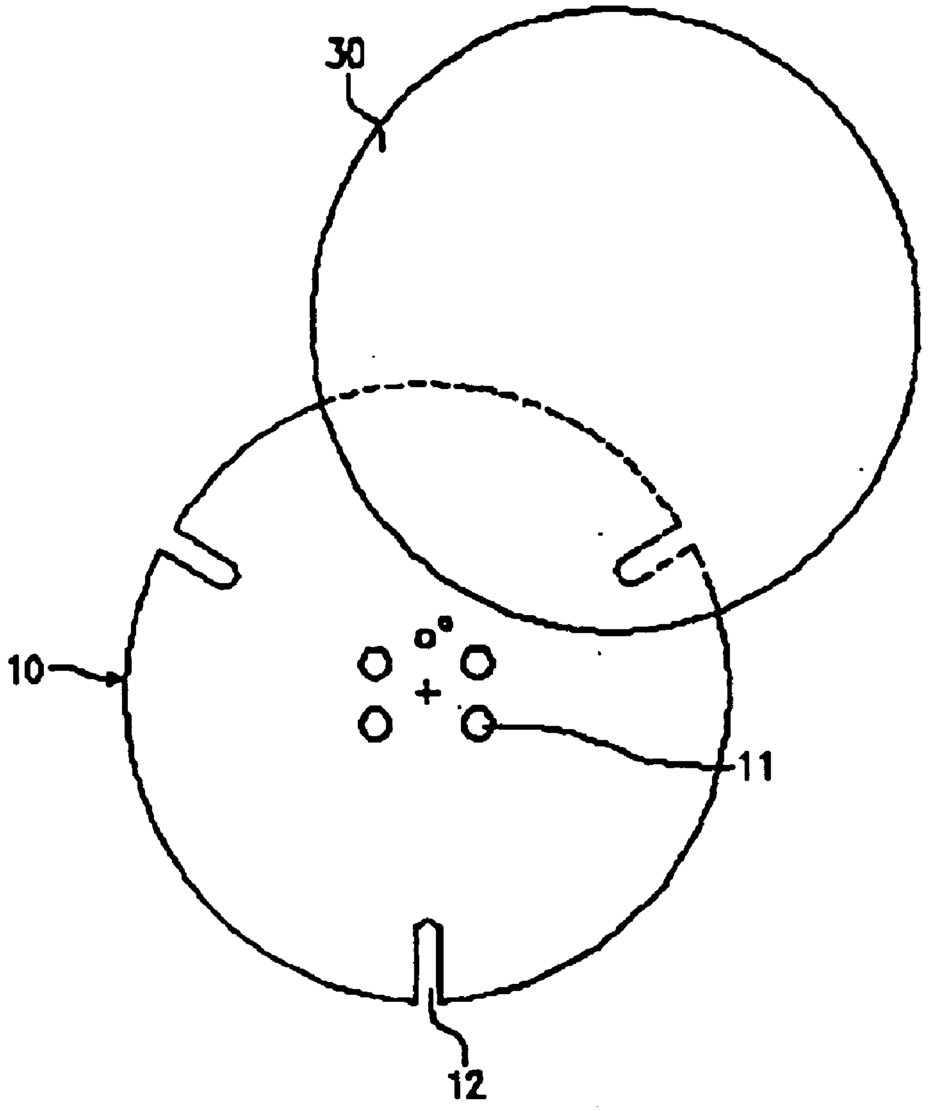
FIG. 1a Prior Art
FIG. 1*a* is a simplified top plan view of a platform of the ion implanter and a pre-trimmed rubber plate.
Figure 1B:
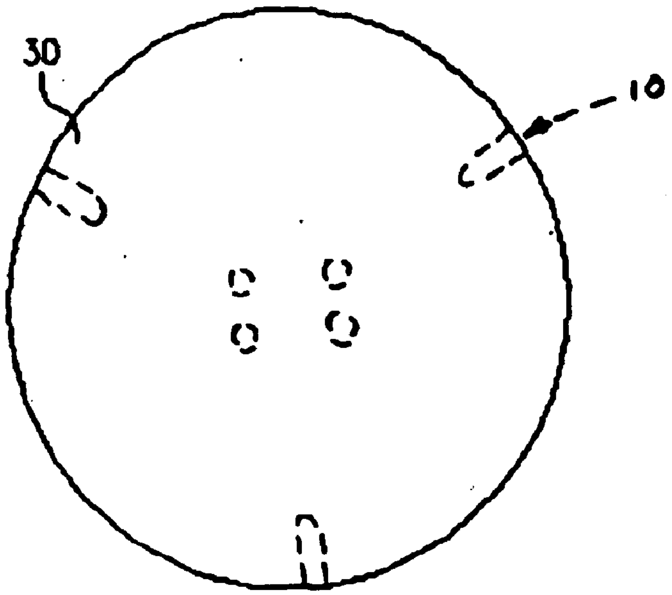
FIG. 1b Prior Art
FIG. 1*b* is a simplified top plan view of a pre-trimmed rubber plate placed on top of the platform.
Figure 1C:
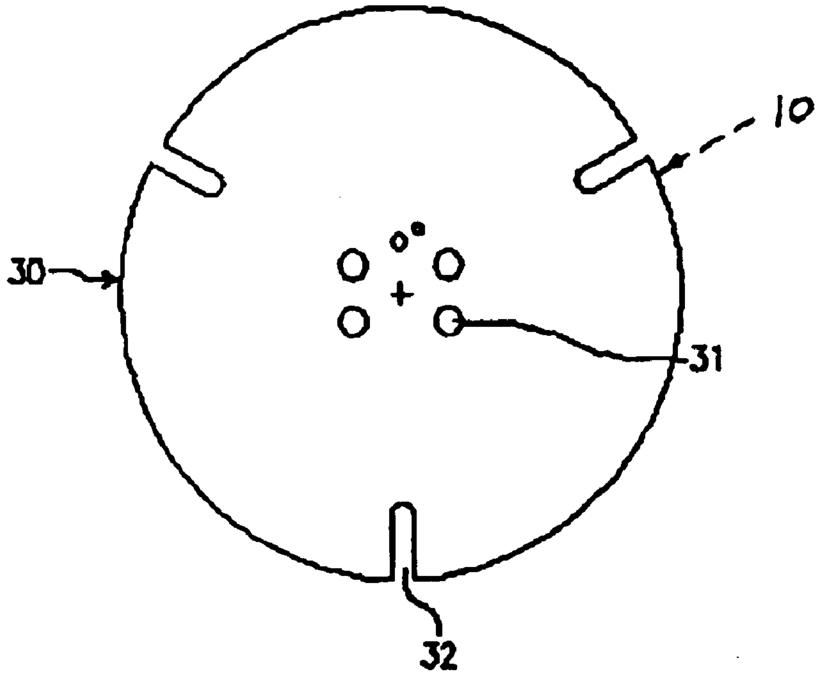
FIG. 1c Prior Art
FIG. 1*c* is a simplified top plan view of a trimmed rubber plate disposed on top of the platform.
Figure 2:
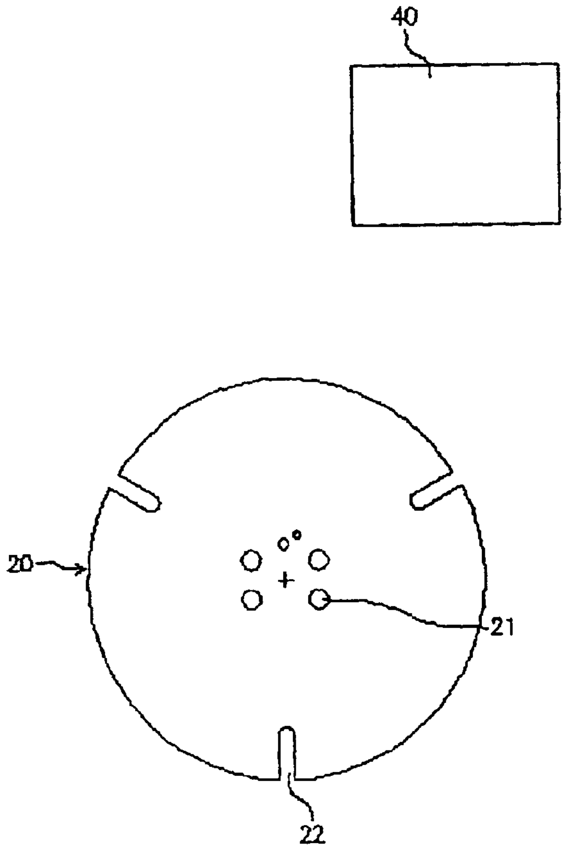
FIG. 2 is a simplified top plan view of the trimming accessories including a template and a trimming equipment according to an embodiment of the present invention.
Figure 2A:
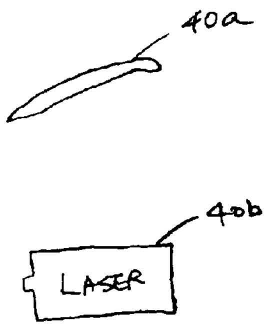
FIG. 2*a* is a simplified schematic view of examples of trimming members.
Figure 2B:
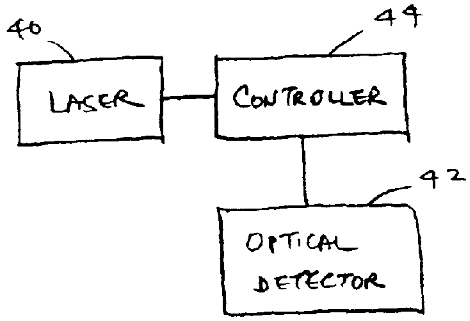
FIG. 2*b* is a block diagram of a control system for operating the trimming equipment.

As shown in FIG. 2, the set of trimming accessories for a rubber plate used in an ion implanter comprises a template 20 and trimming equipment such as a knife or preferably a laser 40 used to trim the rubber plate 30 (FIG. 1*a*). The template 20 is configured to match the shape and features of the platform 10, including multiple secondary holes 21 which correspond to the primary holes 11 of the platform 10 and multiple secondary notches 22 which correspond to the primary notches 12 of the platform 10. The trimming equipment 40 includes a knife, a cutter, or more preferably a laser or the like. FIG. 2*a* shows a knife 40*a* or a laser 40*b* as the trimming member, for example. The template 20 is typically made of a metal but may be made of other materials that will not be damaged or altered by the trimming equipment 40. As shown in FIG. 2*a*, an optical detector 42 may be provided to detect the contours of the template 20 formed by the plurality of secondary holes 21 and the plurality of secondary notches 22. A controller 44 is coupled to the trimming member 40 and to the optical detector to control the trimming member 40 for trimming the rubber plate 30.

Figure 3A:
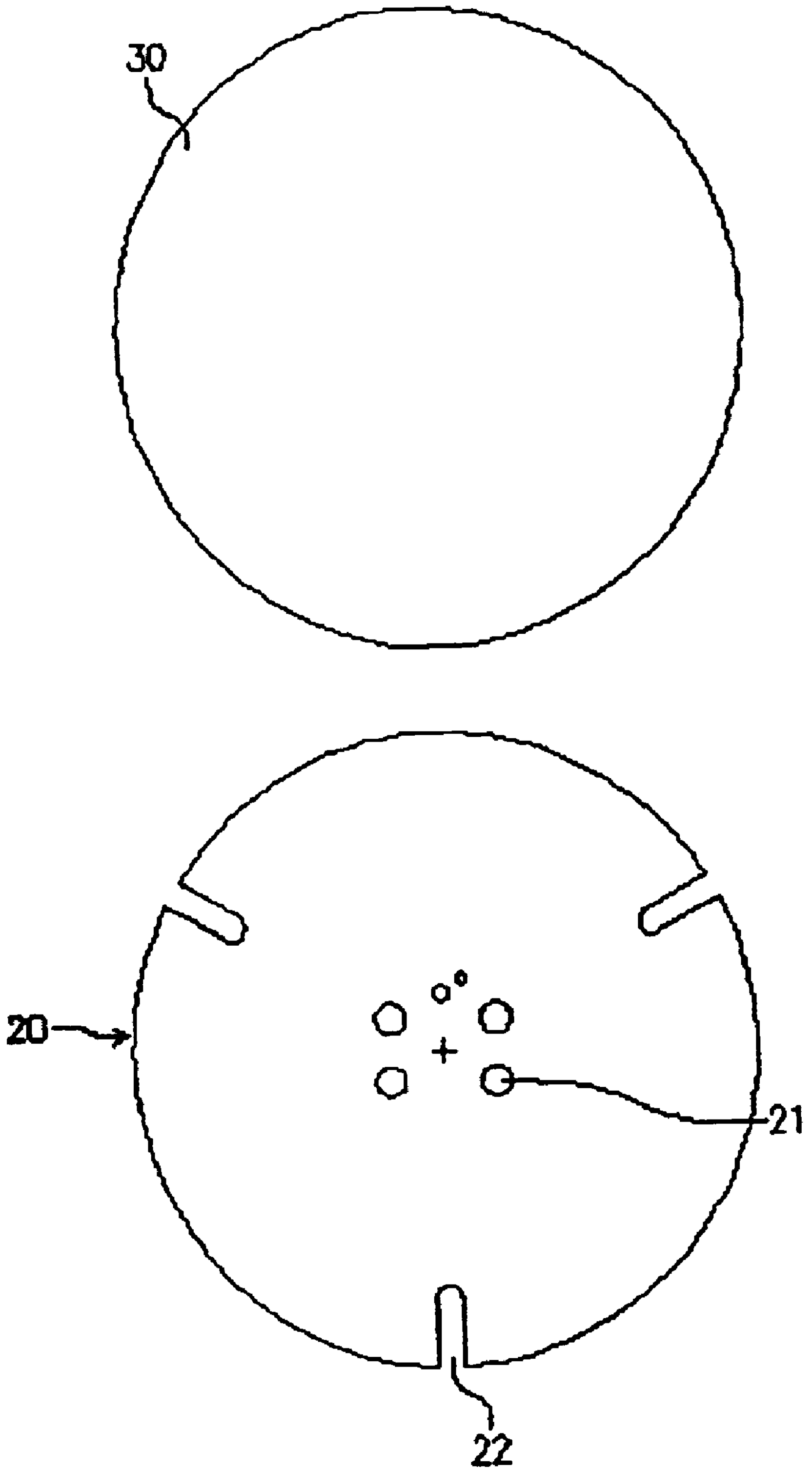
FIG. 3*a* is a simplified top plan view of a template and an pre-trimmed rubber plate.
Figure 3B:
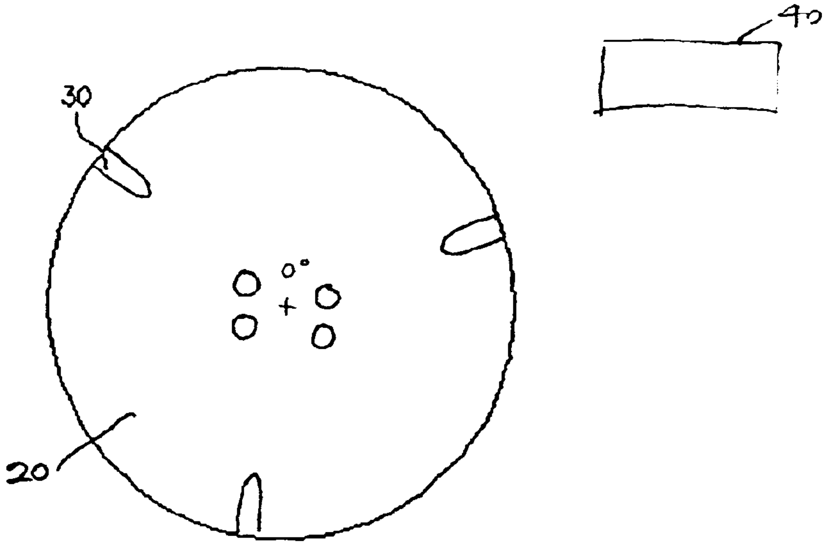
FIG. 3*b* is a simplified top plan view of the pre-trimmed rubber plate placed underneath the template.
Figure 3C:
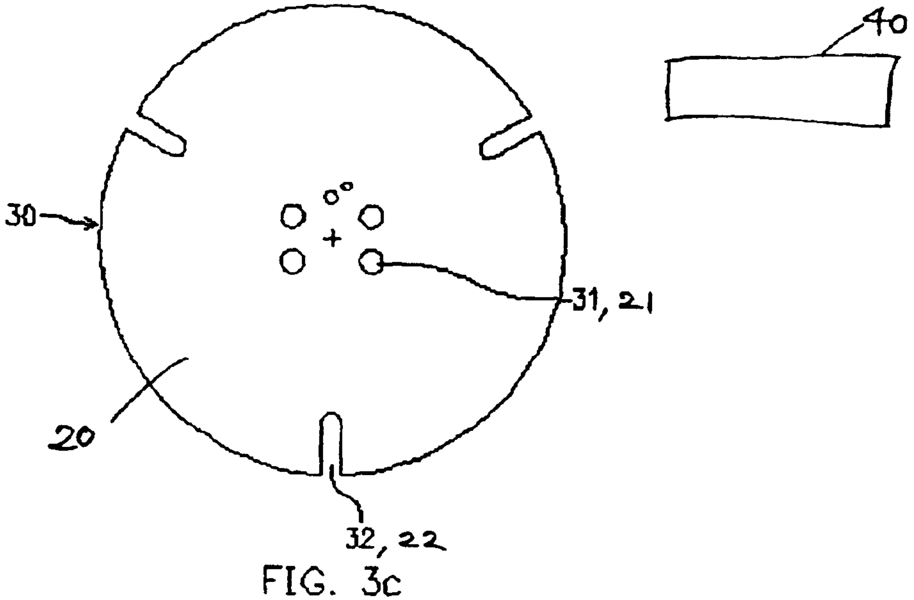
FIG. 3*c* is a simplified top plan view of the trimmed rubber plate disposed underneath the template.

The method according to an embodiment of the present invention includes the following steps. A pre-trimmed rubber plate 30 is shown in FIG. 3*a*. The template 20 has the features of the platform 10. The template 20 is placed on top of the rubber plate 30 as shown in FIG. 3*b*. The rubber plate 30 is trimmed using the trimming equipment 40 as guided by the contour of the template 20. This can be done manually or under automatic control, for instance, using an optical device to follow the contour of the template 20 and guide the trimming equipment 40. The trimming equipment 40 forms a plurality of tertiary holes 31 in the rubber plate 30 according to the secondary holes 21 of template 20 and a plurality of tertiary notches 32 in the rubber plate 30 according to the secondary notches 22 of template 20, as seen in FIG. 3*c*. To automate the trimming process, the optical detector 42 of FIG. 2*a* may be used to detect the contours of the template 20 and provide the detected contours to the controller 44. Based on the detected contours of the template 20 from the optical detector 42, the controller 44 automatically controls the trimming member 40 to trim the rubber plate 30 to form the plurality of tertiary holes 31 and the plurality of tertiary notches 32.

Figure 3D:
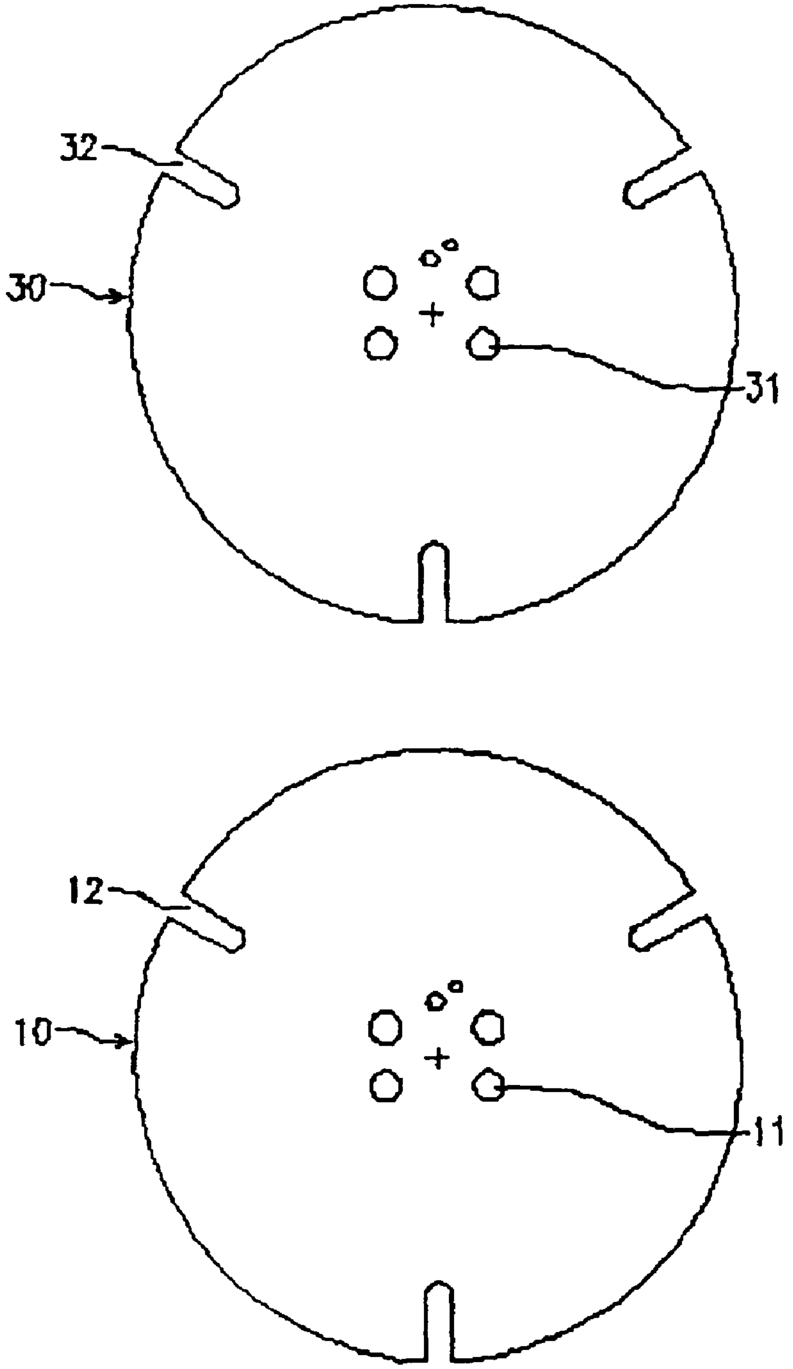
FIG. 3*d* is a simplified top plan view of the platform of the ion implanter, and the trimmed rubber plate.
Figure 3E:
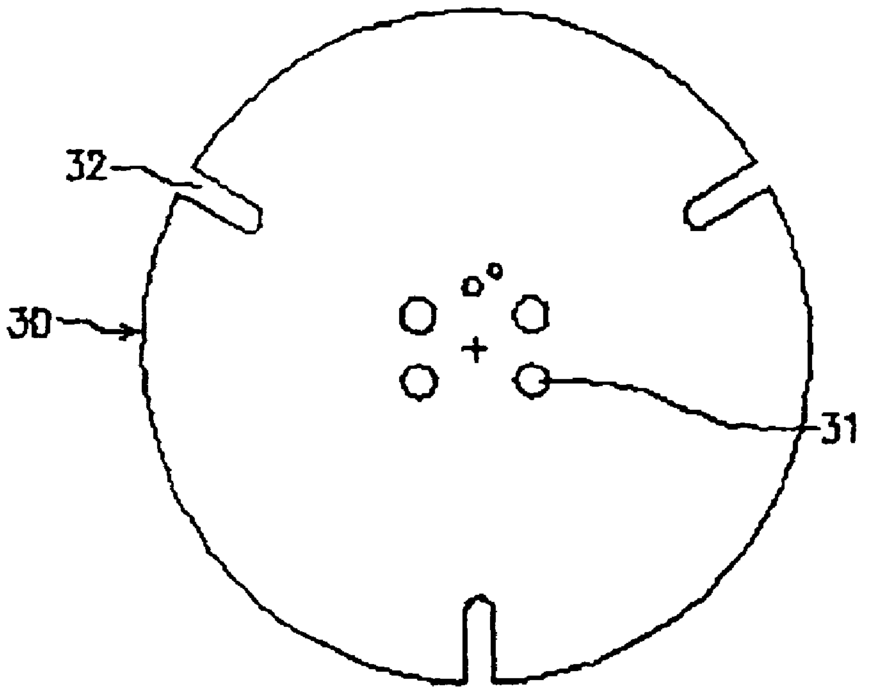
FIG. 3*e* is a simplified top plan view of the trimmed rubber plate placed on the top of the platform.

As shown in FIG. 3*d*, the trimmed rubber plate 30 includes features that match the features of the platform 10. The trimmed rubber plate 30 is then placed onto the platform 10 in the orientation so that the tertiary holes 31 of the rubber plate 30 match the primary holes 11 of the platform 10 and the tertiary notches 32 match the primary notches 12 of the platform 10, as illustrated in FIG. 3*e*.

Accordingly, by applying the method of the present invention, damage to the platform and uneven cooling of the wafer due to uneven attachment between the wafer and the platform are reduced. Thus, the efficiency and life span of the ion implanter is increased.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A method for trimming a rubber plate which is configured to be placed on a platform of an ion implanter, the platform of the ion implanter including a plurality of primary holes and a plurality of primary notches, the method comprising:

providing a template including a plurality of secondary holes corresponding to the plurality of primary holes of the platform of the ion implanter and a plurality of secondary notches corresponding to the plurality of primary notches of the platform of the ion implanter; and prior to placing the rubber plate on the platform of the ion implanter, trimming the rubber plate using the template as a guide to form a plurality of tertiary holes in the rubber plate corresponding to the plurality of secondary holes of the template and to form a plurality of tertiary notches in the rubber plate corresponding to the plurality of secondary notches of the template.

2. The method of claim 1 wherein the template is placed over the rubber plate for guiding a trimming member to trim the rubber plate.

3. The method of claim 1 wherein the rubber plate is trimmed using a trimming member selected from the group consisting of a knife and a laser.

4. The method of claim 1 further comprising providing a controller to automatically control a trimming member based on contours of the template to trim the rubber plate to form the plurality of tertiary holes in the rubber plate corresponding to the plurality of secondary holes of the template and to form the plurality of tertiary notches in the rubber plate corresponding to the plurality of secondary notches of the template.

5. The method of claim 4 further comprising optically detecting the contours of the template and providing the detected contours to the controller to automatically control the trimming member based on the detected contours of the template to trim the rubber plate.

6. The method of claim 1 wherein the tertiary holes in the rubber plate are trimmed to match the primary holes of the platform and the tertiary notches in the rubber plate are trimmed to match the primary notches of the platform.

7. A method for trimming a rubber plate which is configured to be placed on a platform of an ion implanter, the platform of the ion implanter including a plurality of primary holes and a plurality of primary notches, the method comprising:

providing a template including a plurality of secondary holes corresponding to the plurality of primary holes of the platform of the ion implanter and a plurality of secondary notches corresponding to the plurality of primary notches of the platform of the ion implanter;

placing the template over the rubber plate; and prior to placing the rubber plate on the platform of the ion implanter, automatically controlling a trimming member for trimming the rubber plate to form a plurality of tertiary holes in the rubber plate corresponding to the plurality of secondary holes of the template and to form a plurality of tertiary notches in the rubber plate corresponding to the plurality of secondary notches of the template.

8. The method of claim 7 further comprising optically detecting contours of the template and providing the detected contours to the controller to automatically control the trimming member based on the detected contours of the template to trim the rubber plate.

9. The method of claim 7 wherein the tertiary holes in the rubber plate are trimmed to match the primary holes of the platform and the tertiary notches in the rubber plate are trimmed to match the primary notches of the platform.

10. The method of claim 7 wherein the trimming member comprises a laser.

11. The method of claim 7 wherein the trimming member comprises a knife.

12. The method of claim 7 further comprising placing the trimmed rubber plate on the platform so that the tertiary holes of the rubber plate match the primary holes of the platform and the tertiary notches of the rubber plate match the primary notches of the platform.

* * * * *